Sept. 16, 1969  W. H. CAMPBELL ET AL  3,467,273
SEALING OF HIGH PRESSURE VESSELS
Filed July 26, 1968

United States Patent Office 3,467,273
Patented Sept. 16, 1969

3,467,273
SEALING OF HIGH PRESSURE VESSELS
William Henry Campbell, Newcastle-upon-Tyne, and
John Antony Pennell, Cumberland, England, assignors to Vickers Limited, London, England, a British company
Filed July 26, 1968, Ser. No. 748,053
Claims priority, application Great Britain, July 26, 1967, 34,476
Int. Cl. B65d 53/00
U.S. Cl. 220—46        9 Claims

ABSTRACT OF THE DISCLOSURE

An attachment for mounting across an end face of a high pressure vessel to retain sealing ring means in a bore opening through said vessel end face, the attachment including a back-up ring for applying axial end pressure to the sealing ring means, and flexible mounting means which carries the back-up ring and is attachable across the vessel end face in a pre-stressed condition.

---

This invention relates to the sealing of high pressure vessels having a vessel wall part which defines a high pressure bore opening through at least one end face of the vessel body, and is concerned with an improved attachment for retaining sealing ring means in an open bore end. Such sealing ring means can constitute a static closure for the open bore end or can permit entry of a plunger into the bore through the open bore end.

BACKGROUND OF THE INVENTION

During operation of very high pressure equipment employing a vessel subjected to cyclic internal fluid pressure, the static or dynamic seals at each end of the vessel are subject to large outward cyclically varying loads due to the fluid pressure reaction on the radial projected area of the seal. To prevent scoring the vessel bore, with a subsequent reduction in fatigue strength, it is convenient to employ stationary seals mounted in the vessel, particularly when the seal operates against a sliding surface such as a plunger projecting into the bore. The outward seal reaction is thus transmitted via the seal abutment to the vessel, giving rise to axial tensile stresses in it which are particularly concentrated around the seal abutment, at the root of the shoulder on which the seal rests. These tensile stresses reduce the fatigue strength of the vessel (which for ultra high pressure may be constructed of brittle materials weak in tension) and they may give rise to catastrophic failure due to a crack propagating from the seal groove through the vessel wall. Even at lower pressures where the problem of fatigue strength is not as serious, seals mounted in an internal groove in the vessel bore are difficult to remove, so that this method of construction is not satisfactory in any respect.

One method of construction employed in the past makes use of a threaded seal carrier in the form of a ring of larger outside diameter than the bore, which is screwed into a counterbore in the end of the vessel, and carries the seals on its inner end which projects into the bore, In this way the seals can easily be removed for inspection by unscrewing the seal carrier. Furthermore, the vessel bore can be a plain cylinder of maximum strength with no stress concentrations likely to cause failure. However, the axial seal reaction is still transmitted via the seal carrier and engaging threads, to the vessel, which is subject to axial tensile stresses as before. In this case the stresses concentrate round the base of the threaded counterbore which is still a source of weakness, particularly if brittle materials are used for vessel construction. A more serious weakness is present at the threads themselves, which are subjected to a cycle load, and which inevitably incorporate a large stress-concentration. The thread loading must be very low to prevent failure, necessitating an unacceptably large diameter or length of thread, and heavy unwieldly seal carrier which is inconvenient to handle during seal changes. However, the large axial length of the seal carrier requires extra stroke on a plunger unit used to pressurise the vessel, if the top of the plunger is to clear the vessel in the retracted position. This requirement on, for example, a hydrostatic extrusion press, leads to increased cost of the hydraulic intensifier used to actuate the plunger.

It is accordingly an object of this invention to provide a new and improved seal retaining attachment capable of withstanding high working stresses.

It is another object of this invention to provide a new and improved seal retaining attachment having high resistance to fatigue failure.

It is a further object of this invention to provide a new and improved seal retaining attachment which greatly facilitates seal changes.

SUMMARY OF THE INVENTION

The foregoing and other objects are accomplished by providing an attachment for a high pressure vessel having a vessel wall part defining a high pressure bore opening through at least one end face of the vessel, said attachment being operative to retain sealing ring means in the open end of the vessel bore and incorporating a back-up ring of larger overall diameter than the internal diameter of said vessel wall part defining said bore, flexible mounting means for said back-up ring, means for locating said mounting means across said vessel end face in a pre-stressed condition whereby said back-up ring, when mounted in said mounting means, is urged against said vessel end face under a load which is greater than the pressure in the bore under normal working conditions and means for transmitting said load from said back-up ring to an outer end of said sealing ring means.

In the present invention the vessel bore is substantially parallel, with sealing ring means being mounted in load transmitting means projectable into the bore. The end face of the vessel is not counterbored, so that no stress concentrations of any importance arise within the vessel itself. The back-up ring is prestressed against the end of the vessel by a relatively flexible mounting member formed as a plate or beam which spans the end face of the vessel, and bears against the back-up ring at its centre. The outer ends of the beam are restrained axially either by bolting to the outer edge of the vessel (where cyclic stresses are low) the superstructure of the apparatus of which the vessel forms part, or using the long tie-rods running outside the vessel, to a similar attachment at the other end. The prestressing force with which the back-up ring is loaded against the end face of the vessel is at all times greater than the maximum outward reaction on the sealing ring means. Thus the back-up ring is always in contact with the vessel, and actually sets up a beneficial compressive axial stress system in it, which varies with the internal vessel pressure.

Because of the large cross-section of the vessel, the axial strains associated with these varying compressive stresses are small, resulting in very small variation in the stresses in the much more flexible mounting members. Thus the mounting members, and in particular the connections between them and the back-up ring, are subjected to large static loads upon which are superposed only very small fluctuating components. Fatigue failures are unlikely, and stress concentrations are of negligible importance. Very high working stresses are possible in these parts with consequent reduction in size and weight.

BRIEF DESCRIPTION OF THE DRAWINGS

Other objects, features and advantages will become more apparent when taken in conjunction with the accompany drawings in which.

DESCRIPTION OF PREFERRED EMBODIMENTS

Figure 2:
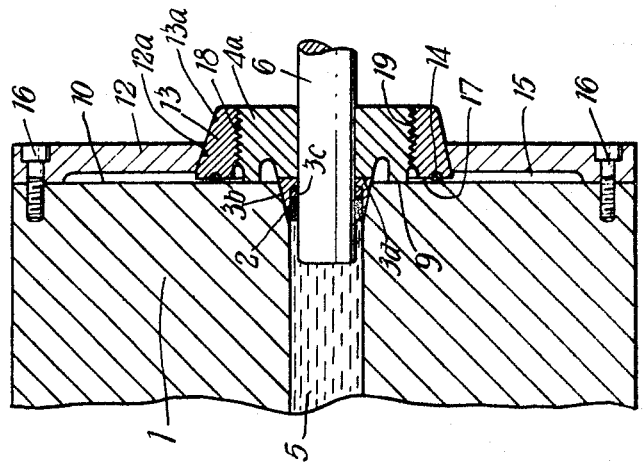
FIGURE 1 shows diagrammatically in axial section an embodiment of an attachment of the invention for retaining sealing ring means in an open bore end of a high pressure vessel in association with such a high pressure vessel and FIGURE 2 shows diagrammatically in axial section another embodiment of an attachment of the invention for retaining sealing ring means in an open bore end of a high pressure vessel in association with a partially represented vessel.

In the embodiments of an attachment of the invention herein described, any convenient type of sealing ring means may be used, but it is particularly advantageous to use sealing ring means 2. Such a sealing ring means 2 is described in the applicants' copending U.S. application Ser. No. 746,623, filed July 22, 1968, entitled "High Pressure Vessels," this sealing ring means being shown in the drawing by way of example.

Figure 1:
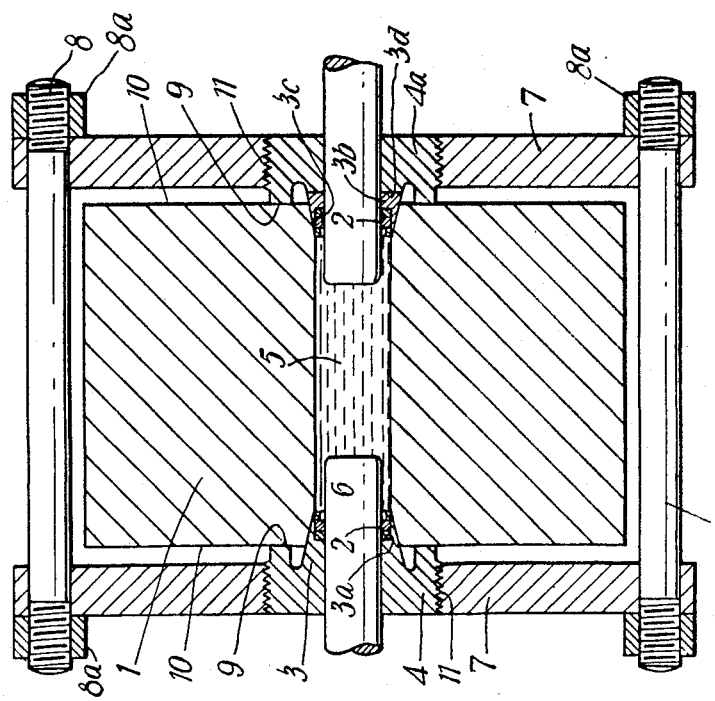

Referring now to the drawings and particularly to FIGURE 1, two attachments of the invention are shown in association with a high pressure vessel 1 of thick-walled construction having a wall part defining a high pressure bore opening through both ends of the vessel body, each attachment being intended to retain sealing ring means 2 in an open bore end of the vessel 1. Each attachment shown in FIGURE 1 incorporates a back-up ring of larger overall diameter than the vessel bore with the back-up ring of the attachment on the left of FIGURE 1 being designated by the reference numeral 4 and the back-up ring of the attachment on the right of FIGURE 1 being designated by the reference numeral 4a.

Each back-up ring is adapted to be urged against an end face 10 of the vessel under a load which is greater than the pressure in the vessel bore under normal working conditions, and each attachment is provided with means for transmitting the load from the back-up ring to an outer-end of the sealing ring means 2. The load transmitting means of the attachment to the left of FIGURE 1 is in the form of an annular nose 3 formed integrally with the ring 4 to project therefrom for projection in turn into the vessel open bore end. This nose 3 has an interanl shoulder 3a for locating the sealing ring means 2 in the nose 3 and thereby in the vessel bore end.

The load transmitting means of the attachment on the right of FIGURE 1 is in the form of an annular sleeve 3b separate from the back-up ring 4a. This sleeve 3b is projectible into the vessel bore end and has an internal shoulder 3c for locating the sealing ring means 2 in the sleeve 3b and thereby in the vessel bore end, an inner face 3d of the ring 4a abutting the outer end of the sleeve 3b for retaining the sleeve 3b in the bore end.

The two attachments shown in FIGURE 1 only differ in the nature of their load transmitting means hereinbefore described and therefore for convenience only the attachment shown on the left of FIGURE 1 will be hereinafter described in greater detail.

In the attachment of the invention shown in FIGURE 1 the sealing ring means 2 is arranged to prevent leakage of pressure fluid 5 past a plunger 6 which projects coaxially through the back-up ring 4 and the sealing ring means into the vessel bore. The plunger 6 is axially slideable by means not shown in FIGURE 1 but may alternatively be made fixed.

Also incorporated in the attachment is a flexible mounting member for the back-up ring 4, formed as a beam 7 which is adapted for prestressed location across the vessel end face 10 to span the latter. In this way the back-up ring 4 is urged against the end face 10 by the beam 7 which is restrained axially of the vessel by tie rods 8 extending between outer ends of the beam and anchorage points at the opposite end of the vessel. Thus a part 9 of an inner end face of the ring 4 abuts against the face 10 under a load which is greater than the outward and opposite reaction pressure generated in the bore under normal working conditions. To this end the part 9 stands proud of the beam 7 when the ring 4 is mounted in the latter. In order to urge the ring part 9 against the vessel face 10 nuts 8a on threaded ends of the tie rods 8 are tightened against the beam 7 to give a total prestressing force sufficient to maintain the part 9 and the face 10 in contact at all times.

Connection between the ring 4 and the beam 7 is effected by mating screw threads 11 provided respectively around the exterior of the ring 4, and around the interior of an aperture in the beam 7. The location of the aperture through the beam 7 is such that the aperture is substantially coaxial with the vessel bore when the beam is spanning the vessel end face 10. These threads 11 are subjected to the full prestressing load, but because of the relative flexibility of the beam 7 and tie rods 8, compared with that of the vessel, they are only subjected to a small part of the cyclic load. Consequently the ring 4 and the beam 7 can be heavily loaded and are much more compact than a threaded closure designed to withstand the full cyclic load.

Because of the heavy prestress, it would be extremely difficult to unscrew the back-up ring 4 from the beam 7 to gain access to the sealing ring means. This action would also unload the mounting member, that is the beam 7 would thus be subjected to a load cycle each time the sealing ring means was removed, with a consequent risk of fatigue failure due to the very high working stresses in these parts. A modification to overcome these difficulties is shown in FIGURE 2.

In the second embodiment shown in FIGURE 2, a back-up ring 4a and separate sleeve 3b are shown for convenience although it is to be understood that a ring 4 as previously described would alternatively be employed. Thus in this embodiment the flexible prestressing mounting member is in the form of a relatively thin circular plate 12 with a central thicker boss 13 which may be integral with the plate, or have a tapered outer surface 13a for wedged engagement in a correspondingly tapered aperture 12a provided in the plate as shown in FIGURE 2. The plate 12 is restrained axially of the vessel 1 by being clamped round its peripheral region to the end face 10 of the vessel 1 such as by bolts 16 screwed into tapped holes provided in the end face 10 so that an inner end face 17 of the boss 13 is urged against the end face 10 of the vessel under a load approximately equal to the maximum bore reaction pressure. An annular hydraulic seal between the end face 10 of the vessel and the face 17 of the boss 13 is provided at 14, together with a supply of hydraulic pressure fluid to an annular region 15 defined between the plate 12, the seal 14 and the vessel end face 10.

By suitably pressurising this region 15 the face 17 of the boss 13 is lifted away from the end face 10 of the vessel a small distance, such that the increase in the prestress in the plate 12 is relatively small, i.e., about 10%. When the boss 13 is in this position, the back-up ring 4a is screwed by external screw threads 18 engaging in corresponding screw threads 19 provided internally in an aperture opening through the boss 13, into the boss 13 against a stop, so that the inner end face part 9 of the ring 4a projects a short distance beyond or stands proud of the inner face 17 of the boss, but does not touch the vessel end face 10. The boss aperture is positioned to be substantially coaxial with the vessel bore when the plate 12 is secured to the vessel and face 10 as aforesaid. The region 15 is then depressurised, whereupon the face part 9 of the ring 4a comes into contact with the end face 10 of the vessel, leaving a slight gap between the inner face 17 of the boss 13 and the vessel end face 10 (see FIGURE 2). Since the final prestress in the plate 12 is then slightly greater than the initial prestress (when the face 17 of the boss 13 is in contact with the vessel end face 10) it follows that it is also at all times greater than the maximum outward seal reaction. Thus the face part 9 and the face 10 remain in contact during the entire pressure cycle within the vessel.

The ring 4a is readily removable from the boss 13 by repressurising the region 15, so that the ring face part 9 lifts off the vessel end face 10, whereupon the ring 4a can be unscrewed since its threads are then in an unloaded state. The load variation in the plate 12 is only a small proportion of the total prestress during seal change operations, so that fatigue failures in this component are unlikely. Only the screw thread 19 in the boss 13 and the screw thread 18 on the outside diameter of the ring 4a are subject to large cyclic stresses during changes of the sealing ring means. These small components 4a and 13 are both made of high strength material, and will thus withstand many thousands of sealing ring means changes without failure.

It is to be understood that in the foregoing embodiments the back-up rings 4 and 4a are interchangeable as desired in the attachments of the invention.

While there have been shown and described preferred embodiments, it is to be understood that various adaptations and variations can be made without departing from the spirit and scope of the invention.

What is claimed is:
1. An attachment for a high pressure vessel having a vessel wall part defining a high pressure bore opening through at least one end face of the vessel, said attachment being operative to retain sealing ring means in the open end of the vessel bore and incorporating:
 (a) a back-up ring of larger overall diameter than the internal diameter of said vessel wall part defining said bore,
 (b) flexible mounting means for said back-up ring,
 (c) means for locating said mounting means across said vessel end face in a prestressed condition whereby said back-up ring, when mounted in said mounting means, is urged against said vessel end face under a load which is greater than the pressure in the bore under normal working conditions, and
 (d) means for transmitting said load from said back-up ring to an outer end of said sealing ring means.

2. An attachment according to claim 1 in which said load transmitting means is of annular form and adapted for projection into said vessel bore, and further incorporates an internal shoulder adapted to locate said sealing ring means.

3. An attachment according to claim 2 in which said load transmitting means is an annular nose which projects from said back-up ring.

4. An attachment according to claim 1 in which said flexible mounting means is a beam dimensioned at least partially to span said vessel end face, said beam having an intermediate portion with a screw threaded aperture therethrough located to be substantially co-axial with the bore defined in said vessel, when said beam is in a spanning position, and in which said back-up ring has complementary external screw-threads and an inner end face with at least part thereof which stands proud of said beam for abutment against said vessel end face.

5. An attachment according to claim 4 in which means for locating said mounting means include tie rods extending lengthwise of the vessel, means for connecting one end of said tie rods to the beam and means for anchoring the opposite ends of said tie rods.

6. An attachment according to claim 1 in which said flexible mounting means is a plate having a boss with an internally screw threaded portion defining an aperture therethrough which is substantially co-axial with the bore defined in the vessel, when said plate is in prestressed location across said vessel end face, and in which said back-up ring has complementary external screw-threads and an inner end face with at least part thereof which stands proud of said boss for abutment against said vessel end face.

7. An attachment according to claim 6 further incorporating an annular hydraulic seal carried by said boss for contact with said vessel end face, an annular chamber defined by said plate, said vessel end face and said seal, and means for supplying hydraulic fluid under pressure to said chamber to control pre-stressing and thereby to facilitate rapid engagement and disengagement of said ring in and from said boss.

8. An attachment according to claim 7 in which said plate and said boss are in wedged interengagement.

9. An attachment according to claim 8 in which means for locating said mounting means includes bolts connecting a peripheral region of said plate to said vessel end face.

References Cited
UNITED STATES PATENTS

| 3,043,638 | 7/1962 | Maha | 220—55 XR |
| 3,270,906 | 9/1966 | Christensen | 220—55 XR |
| 3,182,849 | 5/1965 | Horowitz et al. | 220—46 |

GEORGE T. HALL, Primary Examiner

U.S. Cl. X.R.

220—55; 309—2